Sept. 9, 1947.  R. ELLIS  2,427,047
FLAG
Original Filed May 8, 1943
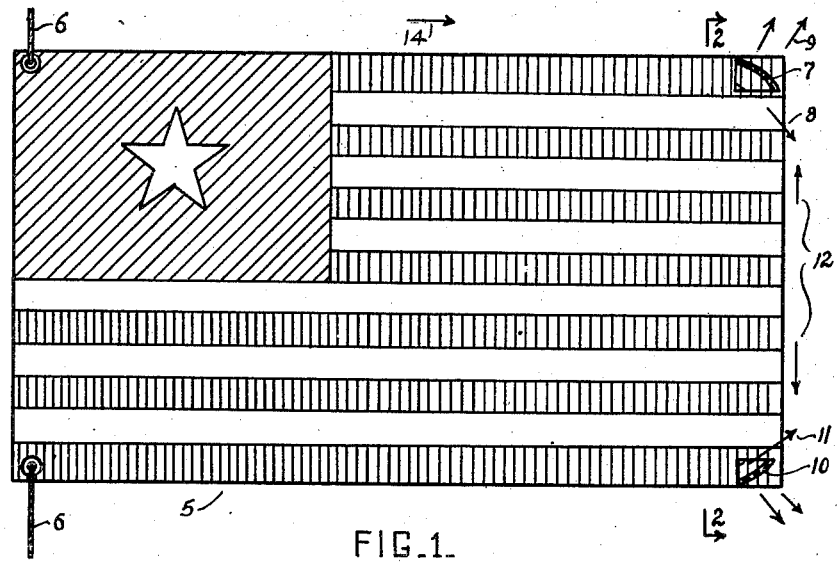
FIG.1.
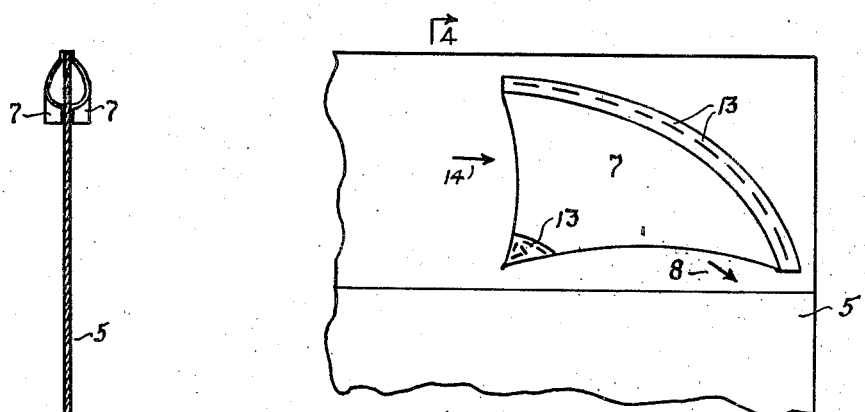
FIG.3.
FIG.4.
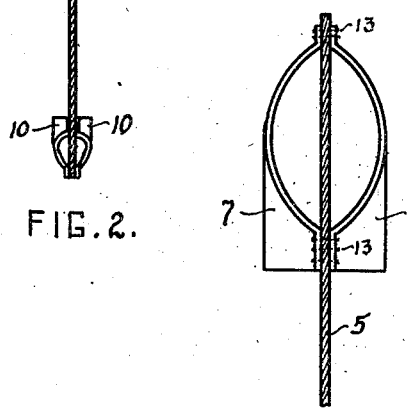
FIG.2.
INVENTOR.
Robert Ellis Patented Sept. 9, 1947

2,427,047

UNITED STATES PATENT OFFICE 2,427,047

FLAG

Robert Ellis, York, Pa.

Original application May 8, 1943, Serial No. 486,129. Divided and this application May 2, 1944, Serial No. 533,687

8 Claims. (Cl. 116—173)

This application is a division of application Serial Number 486,129, filed May 8, 1943, by applicant.

This invention relates to flags and the principal object of the invention is the provision of means attached to the flag which will cause the flag to fly in a lighter wind than has heretofore been possible.

Another object of the invention is the provision of means which will cause the outer vertical edge of the flag to remain taut and vertical while flying and incidentally to prevent the flag from flying too high above the horizontal.

Other and further objects will appear in the specifications and be specifically pointed out in the appended claims, reference being had to the accompanying drawings exemplifying the invention and in which:

Fig. 1 is a general side view of a flag showing my invention attached thereto.

Fig. 2 is a vertical cross section on the line 2—2 of Fig. 1.

Fig. 3 is an enlarged side view of one of the wind deflectors which is the principal feature of my invention.

Fig. 4 is a cross sectional view on the line 4—4 of Fig. 3.

Referring to the drawings in which like numerals and characters of reference refer to similar parts throughout the several views, the numeral 5 denotes the flag in flying position, being secured to the ropes 6 in any preferred manner. Preferably attached by sewing to the upper outer corner of the flag, one on each opposite side of the flag, are wind deflectors 7 which deflect the wind downwardly as indicated by the arrows 8. The upper arcuate edge of the deflector 7 is sewed to the flag along this arcuate edge while the lower edge of the deflector is sewed thereto only on a corner as shown thus forming a trough or channel through which the wind blows. It will be evident that the downward deflection of the wind after striking the inside of deflector 7 will cause the flag to elevate itself in the direction of arrows 9, thus causing the flag to fly horizontally in a very light wind or permitting the use of a flag of heavier and stronger material which will also last longer.

In order to prevent the upper outer corner of the flag from flying too high, another deflector 10 is attached in a similar manner to the lower outer corner of the flag 5, this deflector 10 however, being so disposed that the deflection of the wind is in an upwardly direction as indicated by the arrows 11. As the deflector 10 is of smaller dimension than the deflector 7, it will be evident that the flag 5 will still fly horizontal, the purpose of the deflector 10 being to cause a slight tensional strain between the upper and lower outer corners of the flag, as denoted by arrows 12, so as to keep the outer edge of the flag vertical when flying and incidentally to prevent fluttering in case the upper deflector 7 is acted upon by a sudden gust of wind. Both deflectors 7 and 10 are preferably sewed to the flag by stitches 13 and, being of the same color and material as the flag, at the place of attachment thereto, are practically invisible. The deflectors are also flexible and thus form an arcuate trough through which the wind blows. However, I do not wish to limit myself to flexible material, attachment by sewing nor the precise form, number or location of the deflectors. Arrows 14 denote direction of the wind.

From the foregoing description it will be apparent that I have evolved a flag which will be capable of flying in a very light breeze, one which can be made of stronger and heavier material than was heretofore practical and one which will fly without undue fluttering and consequent wear at the outer edge.

Various changes may be made in the embodiment of the invention hereinabove specifically described without departing from or sacrificing the advantages of the invention as defined in the appended claims.

I claim:

1. A flag composed of a substantially rectangular piece of flexible fabric, means for securing one of the vertical edges of the flag, and a wind deflector attached near the upper corner of the free vertical edge of the flag, said wind deflector causing the wind to be deflected downwardly and to re-act on said flag in an upwardly direction.

2. A flag as in claim 1, said wind deflector comprising a substantially arcuate trough through which the wind blows.

3. A flag composed of a substantially rectangular piece of flexible fabric, means for securing one of the vertical edges of the flag, and a wind deflector attached near the upper corner of the free vertical edge of the flag, said wind deflector comprising an arcuate shaped sector of fabric, the corner and arcuate edge of said deflector being so attached to the flag that the arcuate edge extends towards the said upper corner of said free edge of the flag and forming a wind trough between said corner and arcuate edge of said deflector and a side of the flag.

4. A flag as in claim 3, one of said deflectors being attached to either side of said flag opposite each other.

5. A flag composed of a substantially rectangular piece of flexible fabric, means for securing one of the vertical edges of the flag, and a wind deflector attached near the upper corner of the free vertical edge of the flag, said deflector being of substantially the same material and color as the flag and being so attached to said flag as to create a trough through which the wind can blow and cause said wind to be deflected downward for the purpose of creating an upward re-active thrust to the upper corner of the free vertical edge of the said flag.

6. A flag as in claim 5, said deflector being substantially in the form of a sector of a circle and attached to the flag by sewing only the triangular corner and the arcuate edge thereof to said flag and in such a manner as to leave a slack portion between said places of attachment to the side of the flag for the wind to pass therethrough.

7. A flag composed of a substantially rectangular piece of flexible fabric, means for securing one of the vertical edges of the flag, a wind deflector attached to said flag near the upper corner of the free vertical edge thereof, and an additional wind deflector attached to said flag near the lower corner of the free vertical edge thereof, the said upper deflector being so attached to said flag as to deflect the wind downwardly and create an upwardly re-active thrust to the upper free corner of said flag while the said lower deflector is so attached to said flag as to deflect the wind upwardly and create a downwardly re-active thrust to the lower free corner of said flag.

8. A flag as in claim 7, the said lower wind deflector being of less wind deflecting capacity than the said upper wind deflector.

ROBERT ELLIS.

REFERENCES CITED

The following references are of record in the file of this patent:

UNITED STATES PATENTS

| Number | Name | Date |
| --- | --- | --- |
| 551,158 | Ernst | Dec. 10, 1895 |